(12) United States Patent
Attar et al.

(10) Patent No.: US 11,348,748 B2
(45) Date of Patent: May 31, 2022

(54) SWITCH DEVICE

(71) Applicant: ABB Schweiz AG, Baden (CH)

(72) Inventors: Elham Attar, Skien (NO); Magne Saxegaard, Porsgrunn (NO); Richard Lauritzen, Skien (NO); Ståle Talmo, Skien (NO); Stanley Lohne, Porsgrunn (NO); Martin Kristoffersen, Porsgrunn (NO); Wilhelm Rondeel, Skien (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/118,199

(22) Filed: Dec. 10, 2020

(65) Prior Publication Data

US 2021/0193416 A1    Jun. 24, 2021

(30) Foreign Application Priority Data

Dec. 19, 2019   (EP) ..................... 19218112

(51) Int. Cl.

| | | |
|---|---|---|
| *H01H 33/22* | (2006.01) | |
| *H01H 33/02* | (2006.01) | |
| *H01H 33/91* | (2006.01) | |
| *H02B 13/045* | (2006.01) | |
| *H02B 13/055* | (2006.01) | |

(52) U.S. Cl.
CPC .......... *H01H 33/91* (2013.01); *H01H 33/025* (2013.01); *H01H 33/22* (2013.01); *H02B 13/045* (2013.01); *H02B 13/055* (2013.01)

(58) Field of Classification Search
CPC ...... H01H 33/91; H01H 33/025; H01H 33/22; H01H 33/64; H01H 33/78; H01H 33/56; H01H 2033/566; H01H 2009/526; H01H 33/62; H02B 13/045; H02B 13/055; H02B 13/0354; H02B 13/075; H02B 1/56
USPC .... 218/1, 12–14, 45, 55, 57, 59, 61, 67, 68, 218/79, 80, 97, 100
See application file for complete search history.

(56) References Cited

U.S. PATENT DOCUMENTS

| | | | | |
|---|---|---|---|---|
| 3,876,846 A | * | 4/1975 | Graybill ............. | G01R 31/3272 218/68 |
| 3,947,650 A | * | 3/1976 | Strain .................... | H01H 33/91 218/71 |
| 3,987,260 A | * | 10/1976 | Wilson ................. | H02B 13/075 218/79 |
| 7,767,917 B2 | | 8/2010 | Granhaug et al. | |

(Continued)

FOREIGN PATENT DOCUMENTS

| | | |
|---|---|---|
| EP | 3252793 A1 | 12/2017 |
| TW | 200737634 A | 10/2007 |
| WO | 2014154292 A1 | 10/2014 |

OTHER PUBLICATIONS

Indian Office Action; Application No. 202044053303; dated Jul. 13, 2021; 5 Pages.

(Continued)

*Primary Examiner* — William A Bolton
(74) *Attorney, Agent, or Firm* — Whitmyer IP Group LLC (57) ABSTRACT

A gas-insulated puffer-type switch device for operating inside a sealed gas tight enclosure of an electric power distribution switchgear, the sealed gas tight enclosure being filled with a dielectric gas having a global warming potential lower than that of SF6. The switch device has at least one of improved compactness, minimised electrical stress, maximised heat dissipation and reduced environmental impact.

18 Claims, 1 Drawing Sheet

(56) References Cited

U.S. PATENT DOCUMENTS

| | | | |
|---|---|---|---|
| 8,232,496 B2 | 7/2012 | Granhaug et al. | |
| 9,362,061 B2 | 6/2016 | Endre et al. | |
| 9,510,493 B2 * | 11/2016 | Kieffel | H01H 33/22 |
| 2013/0248338 A1 | 9/2013 | Belloni et al. | |
| 2019/0304719 A1 | 10/2019 | Saxegaard et al. | |

OTHER PUBLICATIONS

EP Search Report; Application No. 19218112.1; Completed: Jun. 3, 2020: dated Jun. 15, 2020; 5 Pages.

* cited by examiner

SWITCH DEVICE

TECHNICAL FIELD

Aspects of the invention relate to a switch device and an electric power distribution switchgear including the switch device.

BACKGROUND

Switchgears are used in electric power systems with the purpose to control, protect and isolate electric equipment. The challenges with such switchgears include minimising electrical stress on the electric insulation and arc quenching medium, maximising heat dissipation and reducing the environmental impact of the switchgear, especially optimising all at the same time.

Switchgears used today for medium voltages are usually gas insulated switchgears, where the insulating gas may be sulphur hexafluoride (SF6). The use of SF6 allows for a compact design of the switchgear since SF6 has excellent arc extinguishing, electrical insulating as well as thermal dissipating properties. Despite the many advantages of SF6, alternatives thereto have recently been introduced due to the high global warming potential (GWP) of SF6.

WO2014154292 A1 discloses an SF6 free switch assembly and switchgear where a vacuum breaker is mounted to a single electrically conductive housing. U.S. Pat. No. 8,232,496 B2 and U.S. Pat. No. 7,767,917 B2 disclose puffer type load break switches. In the disconnected position, separate field controllers electrically screen moving and stationary contact sets. These switches have thermoplastic enclosures for the actuator mechanisms and are primarily intended for use with SF6 as the dielectric insulating medium.

EP3252793 A1 discloses a switching device. The switching device has a first electrically conducting housing which encloses an actuator mechanism for a first contact assembly and a second electrically conducting housing which encloses a second contact assembly. The first electrically conducting housing is arranged at a distance from said second electrically conducting housing.

SUMMARY

In view of the above, a switch device according to claim 1 and an electric power distribution switchgear according to claim 14 are provided.

According to an aspect, there is provided a gas-insulated puffer-type switch device for operating inside a sealed gas tight enclosure of an electric power distribution switchgear, the sealed gas tight enclosure being filled with a dielectric gas having a global warming potential lower than that of SF6. The switch device includes a stationary contact assembly 210 and a movable contact assembly 110, longitudinally movable along an axis of the movable contact assembly 112 between a closed state of the switch device in which the movable contact assembly 110 is in electrical connection with the stationary contact assembly 210 and an open state of the switch device in which the movable contact assembly 110 is not in electrical connection with the stationary contact assembly 210. The switch device also includes a switch actuator mechanism 120 for transmitting a rotational movement of an actuation shaft to a longitudinal movement of the movable contact assembly 110. The switch device also includes an earthing switch and a first terminal 160 electrically connected to the movable contact assembly 110 by a first conductive line 140, the first conductive line 140 including a flexible conductor 142 for accommodating the longitudinal movement of the movable contact assembly 110, the first terminal 160 being further electrically connected to the earthing switch by a second conductive line 460. The switch device also includes a second terminal electrically connected to the stationary contact assembly 210 and an electrically conductive first housing 100 enclosing at least a portion of the movable contact assembly 110, thereby electrically shielding the movable contact assembly 110 when the switch device is in the open state, the first housing 100 further enclosing the switch actuator mechanism 120, the first conductive line 140 and at least a portion of the earthing switch. The first housing 100 includes ventilation openings for allowing a convective stream of the dielectric gas from outside of the first housing 100 through the first housing 100. At least a portion of at least one of the first terminal 160, the first conductive line 140, and the second conductive line 460 is thermally conductively connected to the first housing 100. Reference signs are given only for illustration here but are not intended to limit this aspect to the embodiment shown in FIG. 1.

According to another aspect, there is provided an electric power distribution switchgear including a sealed gas tight enclosure and a switch device for operating with a dielectric gas having a global warming potential lower than that of SF6 being inside the sealed gas tight enclosure.

Some advantages are described as follows. A switch device and a switchgear including the switch device have at least some of improved compactness, minimised electrical stress, maximised heat dissipation and reduced environmental impact, and preferably several or even all of these advantages at the same time.

The use of a dielectric gas having a global warming potential lower than that of SF6, such as air or a gas mixture, reduces the environmental impact but provide less effective electrical insulation compared to SF6, thus design becomes less compact for the same dielectric withstand capability. Particular housing designs, e.g. rounded/smooth external surface (to provide good electric field control) can minimise electrical stress. However, a housing that is optimised for field control, e.g. rounded/smooth external surface, is not optimised for heat (thermal) dissipation, so other heat dissipation measures is needed or current rating is reduced. Thus, the challenges of compactness, environmental impact, electrical stress and heat dissipation are difficult to address simultaneously.

A switch device and a switchgear including the switch device have at least one of the advantages of reduced environmental impact, e.g. operating with a dielectric gas having a global warming potential lower than that of SF6, minimised electrical stress, e.g. the switch actuator mechanism/movable contact assembly is enclosed within the electrically conductive housing having a rounded external surface, and preferably at the same time maximised heat dissipation, e.g. due to at least a portion of at least one of the first terminal 160, the first conductive line, and the second conductive line 460 being thermally conductively connected with the (first) housing.

Further advantages, features, aspects and details that can be combined with embodiments described herein are evident from the dependent claims, the description and the drawings.

BRIEF DESCRIPTION OF THE FIGURES

The details will be described in the following with reference to the figures, wherein FIG. 1 show a schematic of a switch device according to embodiments described herein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment applies to a corresponding part or aspect in another embodiment as well.

The reference numbers used in the figures are merely for illustration. The aspects described herein are not limited to any particular embodiment. Instead, any aspect described herein can be combined with any other aspect(s) or embodiment(s) described herein unless specified otherwise.

According to aspects or embodiments described herein, a switch device is optimised in terms of at least one of compactness, environmental impact, electrical stress and heat dissipation.

Figure 1:
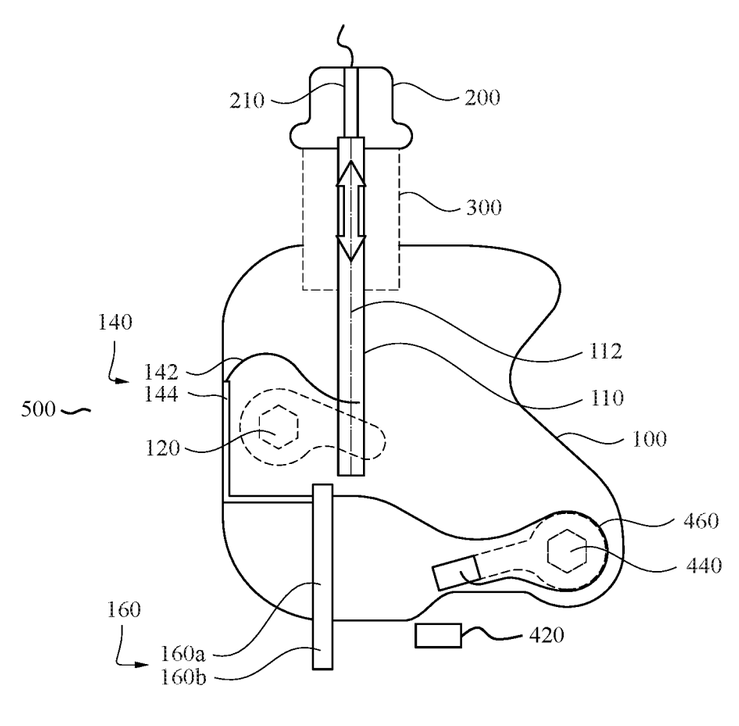

FIG. 1 shows a schematic of a switch device according to embodiments described herein. The switch device may be gas-insulated. The switch device may be a puffer-type switch device. The switch device may be for operating inside a sealed gas tight enclosure. The switch device may be for an electric power distribution switchgear. The sealed gas tight enclosure may be filled with a dielectric gas. The dielectric gas may have a global warming potential lower than that of SF6.

The switch device may include a stationary contact assembly 210. The switch device may include a movable contact assembly 110. The movable contact assembly 110 may be longitudinally movable along an axis of the movable contact assembly 112.

The movable contact assembly 110 may be movable between a closed state and an open state of the switch device. In a closed state (of the switch device), the movable contact assembly 110 may be in electrical connection with the stationary contact assembly 210. In an open state (of the switch device), the movable contact assembly 110 may not be in electrical connection with the stationary contact assembly 210.

The switch device may include a switch actuator mechanism 120. The switch actuator mechanism 120 may be adapted for transmitting a rotational movement of an actuation shaft to a longitudinal movement of the movable contact element 110.

The switch device may include an earthing switch. At least a part of the earthing switch may be housed in the first housing 100. The earthing switch may be electrically connected to the first housing 100. The earthing switch may be for earthing the first housing 100, e.g. when the earthing switch is in a closed state.

The earthing switch may be a knife switch. The earthing switch may include a stationary earthing contact 420 and a movable earthing contact 440. The movable earthing contact 440 may be housed (enclosed/fully enclosed) in the first housing 100, e.g. when the earthing switch is in an open state.

The stationary contact assembly 210 may be arranged inside the second (electrically conductive) housing 200. The second housing may be electrically/mechanically fixed to a busbar(s). The busbar(s) may be of the electric power distribution switchgear in which the switch device is arranged. For example, the second housing 200 may include a mechanical attachment interface for attachment to the busbar. Alternatively, the second housing 200 may be welded or soldered to the busbar.

In embodiments described herein, e.g. with reference to the first housing 100 and/or second housing 200, a first object being enclosed (housed/arranged etc.) inside a second object may be defined as the first object having no portion protruding outside the contour of the second object enclosing said first object. For example, the movable contact assembly 110 may be enclosed inside the first housing 100 (e.g. in an open state) may be defined as no portion (part) of the movable contact assembly 110 is protruding outside the first housing 100. in this example, the first housing 100 forms an effective electric field controller.

As described in embodiments herein, the first housing 100 and/or second housing 200 may function as both an electric field controller and a heat exchanger for the movable contact assembly 110 and/or stationary contact assembly 210 respectively.

The movement of the movable contact assembly 110 is typically accommodated by a full length flexible conductor. A full length flexible conductor is typically costly in manufacturing/processing. Therefore, the first conductive line 140 may include an inflexible conductor 144 portion. The flexible conductor 142 portion and inflexible conductor 144 portion of the first conductive line 140 may be according to embodiments described herein.

The switch device may include a first terminal 160. The first terminal 160 may be a single component. Alternatively, the first terminal may include two parts, a first terminal inner portion 160a, arranged inside the first housing 100, and a first terminal outer portion 160b, arranged outside the first housing 100.

The first terminal 160 (first terminal inner portion 160a) may be electrically connected to the movable contact assembly 110 by a first conductive line 140. The first conductive line 140 may include a flexible conductor 142. The flexible conductor 142 may be adapted for accommodating the longitudinal movement of the movable contact assembly 110.

The first terminal 160 (first terminal inner portion 160a) may be electrically connected to the earthing switch by a second conductive line 460, e.g. the first terminal 160 or first terminal inner portion 160a may be (electrically) connected to the second conductive line 460. The second conductive line 460 may, in turn, be connected to the earthing switch or a part of the earthing switch e.g. the movable earthing contact 440.

The first terminal 160 (first terminal outer portion 160b) may be an electrical connector (socket) or an electrical bushing. The first terminal 160 may provide an electrical connection point from outside the first housing 100 to inside the first housing 100 (to the first conductive line 140). The first terminal 160 may be a static connector element. The first terminal 160 may be arranged partially inside (first terminal inner portion 160a) and partially outside the first housing (first terminal outer portion 160b).

The first terminal 160 (first terminal inner portion 160a) may be connected to an inflexible conductor 144 of the first conductive line 140. The inflexible conductor 144 may be, in turn, connected to a flexible conductor 142 of the first conductive line 140. The flexible conductor 142 may be, in turn, connected to the movable contact assembly 110.

Alternatively, the first terminal (first terminal inner portion 160a) may be (electrically) connected directly to the flexible conductor 142 of the first conductive line 140, e.g. at a first end portion of the flexible conductor 142. A second end portion of the flexible conductor 142 may be (electrically) connected to the movable contact assembly 110. Then inflexible conductor 144 may then be (electrically) connected to the first terminal (first terminal inner portion 160a), e.g. in parallel with the flexible conductor 142.

In another embodiment, the inflexible conductor 144 is the main electrical connection between the first terminal (first terminal inner portion 160a) and the movable contact assembly 110, via the first housing 100, e.g. via the first housing 100 and a further inflexible conductor (not shown) between the first housing 100 and the movable contact assembly 110.

According to an embodiment which can be combined with other embodiments described herein, the first terminal may be attached (fixed) to the first housing 100 at first terminal inner portion 160a, e.g. between the first terminal outer portion 160b and an end portion of the first terminal inner portion 160a or between the first terminal outer portion 160b and a position where the first terminal outer portion 160a is (electrically) connected to the first conductive line 140, flexible conductor 142, inflexible conductor 144 and/or second conductive line 460.

In embodiments, a connection between the first terminal 160, e.g. first terminal inner portion 160a, and the first housing 100 may be thermally and/or electrically conductive. In further embodiments which can be combined with other embodiments described herein, the first terminal 160 may be connected to the first housing 100 at a first terminal inner portion 160a. Alternatively, the first terminal 160 may be connected to the first housing 100 at a position between a connection with the first conductive line 140 (or inflexible conductor 144) and a first terminal outer portion 160b (or a periphery of the first housing 100).

Additionally, at least a portion of at least one of the first conductive line 140, the second conductive line 460, and the first terminal 160 (the portion being, in particular, at least a portion of the first terminal inner portion 160a) may be (thermally conductively) connected to the first housing 100.

The individual or combined (thermally conductive) connection of inner conductive parts such as the first conductive line 140, the second conductive line 460, and/or the first terminal inner portion 160a, to the first housing 100 can improve heat dissipation e.g. to the outside of the first housing 100.

Accordingly, heat dissipation, electrical field control and mechanical stability are improved.

The first terminal 160 or first terminal outer portion 160a may be (electrically) connected to the first conductive line 140, flexible conductor 142, inflexible conductor 144 and/or second conductive line 460. Accordingly, heat dissipation and electrical field control are improved.

The flexible conductor 142 may have a length only as long as is needed for accommodating the movement of the movable contact assembly 110. For example, the flexible conductor 142 may be attached to the first housing 100 at a position that appropriately minimises the distance between the first housing 100 and the movable contact assembly 110.

The inflexible conductor 144 may have a length sufficient to provide sufficient heat conduction. The required heat conduction may correspond to the particular switch device, e.g. current rating. For example, the inflexible conductor 144 may have a length at least 10%, preferably at least 20%, or more preferably at least 30%, or most preferably at least 40% of the length of the flexible conductor 142. Accordingly, heat dissipation is sufficiently increased.

Alternatively, or in addition, the inflexible conductor 144 may be short or even very short.

According to embodiments, the first conductive line 140, inflexible conductor 144, first terminal portion 160a, second conductive line and/or (electrically) conductive parts of the first housing 100 may have shape and dimensions to provide a contact area with the first housing 100, of at least 200 $mm^2$, preferably at least 400 $mm^2$, more preferably at least 600 $mm^2$, or most preferably at least 800 $mm^2$.

In an example, a contact area 500 between the first conductive line 140 (e.g. inflexible conductor 144), and the first housing 100 may be at least 200 mm2. In another example, at least a portion of the first terminal 160, the first conductive line 140 and/or the second conductive line 460 may be thermally conductively connected to the first housing 100.

Accordingly, heat dissipation may be sufficiently increased without compromising the dielectric withstand capability.

According to embodiments, the inflexible conductor 144 may have a surface that substantially conforms to a surface of the first housing 100. According to further embodiments, the inflexible conductor 144 may be fixed to the first housing 100 with at least one, preferably at least two, fasteners, e.g. M6 bolts. The fasteners fixing the inflexible conductor 144 to the first housing may be fastened with at least 10 Nm each. According to embodiments, the inflexible conductor 144 may be in the form of a bar.

In embodiments which may be combined with other embodiments described herein, the number of fastening/fixing points, e.g. bolts, between the first housing 100 and the inflexible conductor 144 may be increased or may be a plurality. Accordingly, the cooling process or heat dissipation may be improved.

In embodiments where the fastening/fixing point(s) are a weak (electrical) contact (joint/touch), undesired parallel currents may be introduced. Accordingly, an insulation layer (electrically insulating) or part may be used, e.g. in the joint to (electrically) insulate the first housing 100 from the inflexible conductor 144 to remove this weak (electrical) contact (joint/touch).

As the first housing 100 may be electrically conductive, and/or at the same potential as the movable contact assembly 110, the interior surface of the first housing 100 does not contribute to electric field control. Accordingly, the interior surface of the first housing 100 may be optimised for heat dissipation. For example, the first housing 100 may be optimised as a heat sink, e.g. the first housing 100 may be a heat sink for at least one component inside the first housing 100. Accordingly, heat dissipation is increased.

The first housing 100 may have a periphery or exterior (outer) form (shape or surface or contour or geometry or profile) adapted as an electric field controller. The periphery of the first housing 100 may be rounded. The periphery of the first housing 100 may have a minimum radius of curvature. A minimum radius of curvature may be 1 mm, preferably 4 mm, and even more preferably 8 mm, and most preferably 12 mm. The periphery of the first housing 100 may vary according to the neighbouring components, e.g. according to (adjacent) parts inside and outside of the first housing 100. Accordingly, electric stress is sufficiently minimised. Accordingly, dielectric withstand capability/compactness is sufficiently increased.

In embodiments, the periphery of the first housing 100 may only include electrically conductive portions of the periphery of the first housing 100, e.g. the electrically conductive periphery of the first housing 100 may be adapted as an electric field controller, e.g. be rounded and/or have a minimum radius of curvature. In an example, the first housing 100 or substantial portion thereof (e.g. the first housing 100 excluding connectors connecting the first housing 100 to a sealed gas tight enclosure enclosing the first housing 100) may be made of metal, e.g. zinc, aluminium, copper or alloys thereof. Accordingly, electric stress is minimised. Accordingly, dielectric withstand capability/compactness is increased.

The at least one component inside the first housing 100 may be an electrically conductive component. The at least one component inside as the first housing may include the movable contact assembly 110, first conductive line 140, inflexible conductor 144, earthing switch, movable earthing contact 440, the second conductive line 460, and/or any portions thereof. Accordingly, heat dissipation is increased.

Components such as the first housing 100, second housing 200 and/or the at least one component inside the first housing 100 (or second housing 200) may be (made of) a metal e.g. zinc, aluminium, copper or alloys thereof. Zinc has a lower production (material) cost, while copper is a better electrical/thermal conductivity. Aluminium offers a balance of production (material) cost and electrical/thermal conductivity.

According to embodiments, the interior geometry of the first housing 100 may have an optimised contact with at least one component, e.g. maximal contact area, contact is optimised for heat transfer/conduction, and/or an interior surface of first housing 100 contacting a surface (contacting surface) of at least one component inside the first housing 100 matches/corresponds the surface (contacting surface) of the at least one component inside the first housing 100.

According to embodiments, the first housing 100 may be optimised for thermal contact conductance (minimum thermal contact resistance) with at least one component inside the first housing 100. For example, the first housing 100 may have a minimum contact pressure, for example connectors (e.g. two or more bolts (e.g. M6 bolts)) connecting the at least one component inside the first housing 100 to the first housing may have a minimum tightening torque (e.g. at least 10 Nm on each bolt), and/or the same material with one of the at least one component inside the first housing 100.

More generally, any combination of contact pressure, interstitial materials, surface roughness, waviness and flatness, surface deformations, surface cleanliness and thermal conductivity (of a contacting surface of at least one component inside the first housing 100 with an interior surface of the first housing 100) may be used to suitably optimised heat dissipation from the at least one component inside the first housing 100 to outside the first housing 100.

The second conductive line 460 may have an inflexible conductor portion according to embodiments of the inflexible conductor 144 of the first conductive line 140. For example, the second conductive line 460 may include a flexible conductor and an inflexible conductor. The inflexible conductor of the second conductive line 460 may be formed in the same way as the inflexible conductor 144 of the first conductive line 140 for increased heat dissipation. An interior surface of the first housing 100 may be suitably optimised for heat transfer with the second conductive line 460 and/or the inflexible conductor of the second conductive line 460.

An end of the flexible conductor 142 of the first conductive line 140 may be electrically connected to the movable contact assembly 110, and the other end may be electrically connected to the inflexible conductor 144 of the first conductive line 140. Accordingly, one end of the inflexible conductor 144 may be electrically connected to the flexible conductor 142, and the other end may be electrically connected to the first terminal 160 (first terminal inner portion 160*a*).

Accordingly, the movable contact assembly 110, the first conductive line 140, the earthing switch, and/or the movable earthing contact 440 may be in good thermal connection with the first housing 100, e.g. is in good thermal conduction connection with the first housing 100. Accordingly, the first housing 100 may be a heat sink for the movable contact assembly 110, the first conductive line 140, the earthing switch, and/or the movable earthing contact 440.

In a specific example, the first conductive line 140 may include a solid copper bar as the inflexible conductor 144, which may be placed on a flat interior surface of the first housing 100, and bolted thereon. Accordingly, the heat dissipation is increased.

The switch device may include a second terminal. The second terminal may be electrically connected to the stationary contact assembly 210.

The switch device may include an electrically conductive first housing 100. The first housing 100 may enclose at least a portion of the movable contact assembly 110. The first housing 100 may electrically shield the movable contact assembly 110 when the switch device is in the open state. For example, the first housing 100 may enclose the movable contact assembly 110, e.g. when the switch device is in an open state.

The first housing 100 may enclose the switch actuator mechanism 120. The first housing 100 may enclose the first conductive line 140. The first housing 100 may enclose a portion of the earthing switch.

According to embodiments, the first housing 100 and/or second housing 200 may be unsealed housings. For example, there may be openings in the first housing 100 and/or second housing 200 for the movable contact assembly 110 to move through (enter and exit).

The first housing 100 and/or second housing 200 may have openings (the same openings as above or different openings) to allow (convective) cooling (streams). The first housing 100 (and/or second housing 200) may include ventilation openings. In an example, the ventilation openings can allow a convective stream of the dielectric gas from outside of the first housing 100 through the first housing 100 (and/or second housing 200 respectively).

In embodiments which may be combined with other embodiments described herein, the openings of the second housing 200 and/or the third housing 300 may also provide (arc/current) interruption capability. For example, said openings of the second housing 200 and/or the third housing 300 may provide (ease/improve) evacuation of hot (polluted) gas about the contacts (contacting surfaces between the movable contact assembly 110 and stationary contact assembly 210). For example, the hot (polluted) gas may be produced during (arc/current) interruption. In an example, the openings provide (ease/improve) hot (polluted) gas evacuation just after (arc/current) or during interruption or contact separation.

The arcing during (arc/current) interruption can make the (dielectric) gas (dielectrically) weak. The (dielectrically) weak (dielectric) gas may be replaced by fresh gas in order to (fully) interrupt the current. The openings of the second housing 200 and/or the third housing 300 (and/or of the stationary contact assembly 210) may thus provide increased (arc/current) interruption capability.

The first housing 100 and second housing 200 may be designed to ensure an optimal electric field, e.g. without sharp edges and components intended to stay at different electric potential, e.g. the first housing 100 and/or components inside the first housing 100 such as the movable contact assembly 110 versus the second housing 200 and/or components inside the second housing 200, shall be kept at a minimum distance from each other.

It has been stated that the second housing 200 encloses the stationary contact assembly 210. The term "enclose" (housed/arranged within etc) is to be construed as encircle or embrace, it is not meant to define that the second housing 200 forms a sealed enclosure for the stationary contact assembly 210. The same is valid for the first housing 100.

The first housing 100 to be at the same electrical potential as the movable contact assembly 110. For example, the first housing 100 may be electrically connected to at least one component inside the first housing 100, e.g. the first conductive line 140, the inflexible conductor 144, and/or the movable contact assembly 110.

The first housing 100 may have a thermal conductivity of at least 100 W/mK. For example, zinc, aluminium, copper, or alloys thereof may have thermal conductivity of at least 100 W/mK. Accordingly, heat dissipation may be sufficiently increased.

An average (arithmetic) roughness of an exterior surface or substantial portion thereof (e.g. at least 50%, 75%, 90% or 99% of the exterior surface) of the first housing 100 may be 1 μm and 20 μm, or preferably between 4 μm and 8 μm. The first housing 100 may be made of a metal, e.g. zinc, aluminium, copper or an alloy thereof. An exterior surface of the first housing 100 having a roughness as defined above may be a metal exterior surface of the first housing 100 (metal surface of the first housing 100 may contribute to the majority of the heat dissipation).

Accordingly, the electric field control effect is sufficient/ not detrimentally compromised, while heat dissipation is sufficiently increased. Accordingly, compactness is sufficiently improved.

A second housing 200 may be provided. The second housing 200 may be electrically conductive. The second housing 200 may enclose and/or be electrically connected to the stationary contact assembly 210, e.g. for the second housing to be at the same electrical potential as the stationary contact assembly 210.

Embodiments of the first housing 100 may be applied to the second housing 200 with corresponding advantages/ effects.

For example, the second housing 200 may have a minimum radius of curvature as described in embodiments of the first housing 100. In another example, the second housing 200 may be made of zinc, aluminium, copper, and/or alloys thereof. In yet another example, the second housing 200 may have an interior surface optimised for heat transfer with the stationary contact assembly 210.

In a further example, the second housing 200 may have a thermal conductivity of at least 100 W/mK. In another example, the second housing 200 may have an exterior surface/periphery with an average (arithmetic) roughness in a range of 1-20 μm, or preferably 4-8 μm. Accordingly, heat dissipation is increased and dielectric requirements (e.g. voltage rating) still met. Further examples of the second housing 200 according to embodiments of the first housing 100 are omitted for brevity.

In embodiments, the switch device may include the first (electrically conductive) housing 100 and the second (electrically conductive) housing 200. The first housing 100 may enclose encloses the switch actuator mechanism 120. The switch actuator mechanism 120 may be for actuating the movable contact assembly 110. For example, the actuator mechanism is arranged to move the movable contact assembly between the open state and the closed state. The second housing 200 may enclose the stationary contact assembly 210. The first housing 100 may be arranged at a distance from the second housing 200.

A (sealed gas tight) enclosure (of the electric power distribution switchgear) may be provided. The enclosure may comprise a through-hole into which a switch device operating shaft of electrically insulating material may be inserted. Said switch device operating shaft may be adapted to operate the switch actuator mechanism 120 (for actuating the movable contact assembly 110). The switching device operating shaft may be configured to rotate about its longitudinal axis for operating said switch actuator mechanism 120. In a similar manner, there may be arranged an earthing switch operating shaft if the first housing 100 encloses at least one component of an earthing switch e.g. a movable earthing contact 440.

The arrangement of the movable contact assembly 110 and stationary contact assembly 210 at a distance, or at least an actuator mechanism of the movable contact assembly 110, in separate (electrically conductive) housings 100, 200, improves the dielectric withstand capability of the switching device. Both the phase-to-phase and the phase-to-ground electrical insulation levels are increased. Thereby, the dielectric requirements on the medium surrounding the switching device are reduced. It has been shown that in this way the commonly used electric insulating and arc quenching medium SF6 can be exchanged for a medium of a lower global warming potential.

A third housing 300 may be provided. The third housing 300 may be electrically insulating.

The movable contact assembly 110 may be adapted to be movable within the third housing 300. The third housing 300 may be arranged between the first housing 100 and the second housing 200.

The switch device may be for an electric power distribution switchgear. The switch device may be for operating with a dielectric medium (electrically insulating gas). The dielectric medium may be a non-SF6 gas. The dielectric medium may be a gas having a global warming potential lower than that of SF6. The dielectric gas may be air, dry air, or a gas mixture, e.g. a gas mixture including an insulating gas having a global warming potential lower than that of SF6. For example, the dielectric medium may be a gas mixture including an organofluorine compound selected from the group consisting of: a fluorether, an oxirane, a fluoramine, a fluoroketone, a fluoroolefin, a fluoronitrile, and mixtures and/or decomposition products thereof.

The switch device may be rated for a maximum voltage (RMS/AC) voltage in the range 1 kV to 52 kV, preferably 10 kV to 42 kV, and more preferably 12 kV to 24 kV. The voltage range of 1 kV to 52 kV AC can be referred to as medium voltage (MV), see standard EC 62271-103. However, all voltages above 1 kV can be referred to as high voltage (HV).

According to some embodiments, which can be combined with other embodiments described herein, the switch device may be rated for maximum voltage (RMS/AC) of 18 kV, preferably 16 kV, and most preferably 12 kV. For example, the switch device may be for operating with (dry) air as dielectric medium and a maximum (RMS/AC) voltage of 18 kV, (dry) air and 16 kV, or (dry) air and 12 kV.

According to some embodiments, which can be combined with other embodiments described herein, the switch device may be rated for a maximum voltage (RMS/AC) of 52 kV, preferably 41 kV, more preferably 36 kV, and most preferably 24 kV. For example, the switch device may be for operating with a gas mixture (having a global warming potential lower than that of SF6) as dielectric medium and a maximum voltage (RMS/AC) of 52 kV, gas mixture and 41 kV, gas mixture and 36 kV, or gas mixture and 24 kV.

In an example, the switch device may be adapted for use with (dry) air as the dielectric medium for a maximum voltage (RMS/AC) of 18 kV (or 16 kV or 12 kV), and for use with a gas mixture (having a global warming potential lower than that of SF6) as the dielectric medium for a maximum voltage (RMS/AC) of 52 kV (or 41 kV, or 36 kV or 24 kV).

Alternatively, in embodiments which may be combined with other embodiments described herein, the switch device may be rated for maximum voltage (RMS/AC) of 26 kV (or 24 kV or 18 kV), and the switch device for operating with (dry) air as the dielectric medium. The switch device may be scaled up. In an example, the switch device may be larger for increased dielectric withstand capability.

In another example, the switch device may be configured for operating with a dielectric gas at higher pressures for increased dielectric withstand capability. For example, the dielectric gas, e.g. air/dry air, may be at a pressure at least 1 bar, preferably at least 1.3 bar, more preferably at least 1.5 bar, and most preferably at least 1.7 bar. A higher pressure of the dielectric gas can provide the necessary dielectric withstand for a higher maximum voltage (RMS/AC), e.g. 26 kV, 24 kV or 18 kV.

The switch device described in embodiments may be a puffer type switch. The advantage of using a puffer type switch device is that relatively high electric power can be managed at a relatively low cost while the dielectric requirements on the medium surrounding the switch device are reduced. Preferably, the switch device is a load break switch and/or the switch device is a disconnector (e.g. in combination with a vacuum interrupter).

The first housing 100 may provide a structure for mechanical attachment of components inside the first housing 100, e.g. the movable contact assembly 110. The first housing 100 may provide further mechanical functions. For example, the first housing 100 may include a guide slot. The guide slot may be adapted for guiding the longitudinal movement of the movable contact assembly 110 along the axis of the movable contact assembly 112. Accordingly, the (plurality of) functions of mechanical structure (attachment/guide), electrical field controller, and heat sink may integrally be provided by the first housing 100. Accordingly, the compactness of the switch device is improved.

The movable contact assembly 110 may include an arc resistant inner nozzle and a highly conductive main contact element. The stationary contact assembly 210 may include an arc resistant contact pin and a highly conductive multi contact element.

An electric power distribution switchgear may include a sealed gas tight enclosure and a switch device for operating with a dielectric gas having a global warming potential lower than that of SF6 being inside the sealed gas tight enclosure. The switch device may be according to embodiments described herein.

In FIG. 1, dashed lines are used merely to improve clarity e.g. for distinguishing between components.

Further embodiments will be described in the following.

According to embodiment 1, there is provided a gas-insulated puffer-type switch device for operating inside a sealed gas tight enclosure of an electric power distribution switchgear, the sealed gas tight enclosure being filled with a dielectric gas having a global warming potential lower than that of SF6, the switch device comprising: a stationary contact assembly (210); a movable contact assembly (110), longitudinally movable along an axis of the movable contact assembly (112) between a closed state of the switch device in which the movable contact assembly (110) is in electrical connection with the stationary contact assembly (210) and an open state of the switch device in which the movable contact assembly (110) is not in electrical connection with the stationary contact assembly (210); a switch actuator mechanism (120) for transmitting a rotational movement of an actuation shaft to a longitudinal movement of the movable contact assembly (110); an earthing switch; a first terminal (160) electrically connected to the movable contact assembly (110) by a first conductive line (140), the first conductive line (140) comprising a flexible conductor (142) for accommodating the longitudinal movement of the movable contact assembly (110), the first terminal (160) being further electrically connected to the earthing switch by a second conductive line (460); a second terminal electrically connected to the stationary contact assembly (210); an electrically conductive first housing (100) enclosing at least a portion of the movable contact assembly (110), thereby electrically shielding the movable contact assembly (110) when the switch device is in the open state, the first housing (100) further enclosing the switch actuator mechanism (120), the first conductive line (140), and at least a portion of the earthing switch, wherein the first housing (100) comprises ventilation openings for allowing a convective stream of the dielectric gas from outside of the first housing (100) through the first housing (100), and wherein at least a portion of at least one of the first terminal (160), the first conductive line (140), and the second conductive line (460) is thermally conductively connected to the first housing (100).

According to embodiment 2, it is provided the switch device according to embodiment 1, wherein the first housing (100) comprises a guide slot for guiding the longitudinal movement of the movable contact assembly (110) along the axis of the movable contact assembly (112).

According to embodiment 3, it is provided the switch device according to embodiment 1 or 2, wherein the earthing switch is electrically connected to the first housing (100) for earthing the first housing (100) when the earthing switch is in a closed state.

According to embodiment 4, it is provided the switch device according to any of embodiments 1 to 3, wherein the earthing switch is a knife switch and comprises a stationary earthing contact and a movable earthing contact (440), wherein the movable earthing contact (440) is enclosed in the first housing (100) when the earthing switch is in an open state.

According to embodiment 5, it is provided the switch device according to any of embodiments 1 to 4, wherein the first housing (100) is electrically connected to the movable contact assembly (110) for being at the same electrical potential as the movable contact assembly (110).

According to embodiment 6, it is provided the switch device according to any of embodiments 1 to 5, wherein the first housing (100) has a thermal conductivity of at least 100 W/mK.

According to embodiment 7, it is provided the switch device according to any of embodiments 1 to 6, wherein a contact area between the first conductive line (140) and the first housing (100) is at least 200 mm$^2$, preferably at least 400 mm$^2$.

According to embodiment 8, it is provided the switch device according to any of embodiments 1 to 7, wherein an arithmetic average roughness of an exterior surface of the first housing (100) is between 1 μm and 20 μm, preferably between 4 μm and 8 μm.

According to embodiment 9, it is provided the switch device according to any of embodiments 1 to 8, wherein the first housing (100) is made of zinc, copper, aluminium, or alloy thereof, and/or a metal exterior surface of the first housing (100) has an arithmetic average roughness between 1 μm and 20 μm, preferably between 4 μm and 8 μm.

According to embodiment 10, it is provided the switch device according to any of embodiments 1 to 9, wherein the first housing (100) encloses the movable contact assembly (110) when the switch device is in an open state.

According to embodiment 11, it is provided the switch device according to any of embodiments 1 to 10, further comprising a second electrically conductive housing (200); the second housing (200) enclosing and being electrically connected to a stationary contact assembly (210) for being at the same electrical potential as the stationary contact assembly (210).

According to embodiment 12, it is provided the switch device according to any of embodiments 1 to 11, further comprising a third electrically insulating housing (300) within which the first movable contact assembly (110) is movable, the third housing (300) being arranged between the first housing (100) and the second housing (200).

According to embodiment 13, it is provided the switch device according to any embodiments 1 to 12, wherein the first terminal (160) is connected to the first housing (100) at a first terminal inner portion (160a), or between a connection with the first conductive line (140) or inflexible conductor (144) and a first terminal outer portion (160b) or a periphery of the first housing (100).

According to embodiment 14, it is provided an electric power distribution switchgear comprising a sealed gas tight enclosure and a switch device for operating with a dielectric gas having a global warming potential lower than that of SF6 being inside the sealed gas tight enclosure, the switch device being according to any of embodiments 1 to 13.

According to embodiment 15, it is provided the electric power distribution switchgear of embodiment 14, wherein the dielectric gas is air, dry air, or an organofluorine compound selected from the group consisting of: a fluorether, an oxirane, a fluoramine, a fluoroketone, a fluoroolefin, a fluoronitrile, and mixtures and/or decomposition products thereof.

The invention claimed is:

1. A gas-insulated puffer-type switch device for operating inside a sealed gas tight enclosure of an electric power distribution switchgear, the sealed gas tight enclosure being filled with a dielectric gas having a global warming potential lower than that of SF6, the switch device comprising:
   a stationary contact assembly;
   a movable contact assembly, longitudinally movable along an axis of the movable contact assembly between a closed state of the switch device in which the movable contact assembly is in electrical connection with the stationary contact assembly and an open state of the switch device in which the movable contact assembly is not in electrical connection with the stationary contact assembly;
   a switch actuator mechanism for transmitting a rotational movement of an actuation shaft to a longitudinal movement of the movable contact assembly;
   an earthing switch;
   a first terminal electrically connected to the movable contact assembly by a first conductive line, the first conductive line comprising a flexible conductor for accommodating the longitudinal movement of the movable contact assembly, the first terminal being further electrically connected to the earthing switch by a second conductive line;
   a second terminal electrically connected to the stationary contact assembly;
   an electrically conductive first housing enclosing at least a portion of the movable contact assembly, thereby electrically shielding the movable contact assembly when the switch device is in the open state, the first housing further enclosing the switch actuator mechanism, the first conductive line, and at least a portion of the earthing switch,
   wherein at least a portion of at least one of the first terminal, the first conductive line, and the second conductive line is thermally conductively connected to the first housing.

2. The switch device according to claim 1, wherein the first housing comprises a guide slot for guiding the longitudinal movement of the movable contact assembly along the axis of the movable contact assembly.

3. The switch device according to claim 1, wherein the earthing switch is electrically connected to the first housing for earthing the first housing when the earthing switch is in a closed state.

4. The switch device according to claim 1, wherein the earthing switch is a knife switch and comprises a stationary earthing contact and a movable earthing contact, wherein the movable earthing contact is enclosed in the first housing when the earthing switch is in an open state.

5. The switch device according to claim 1, wherein the first housing is electrically connected to the movable contact assembly for being at a same electrical potential as the movable contact assembly.

6. The switch device according to claim 1, wherein the first housing has a thermal conductivity of at least 100 W/mK.

7. The switch device according to claim 1, wherein a contact area between the first conductive line and the first housing is at least 200 mm$^2$.

8. The switch device according to claim 1, wherein an arithmetic average roughness of an exterior surface of the first housing is between 1 μm and 20 μm.

9. The switch device according to claim 1, wherein the first housing is made of zinc, copper, aluminium, or alloy thereof, or wherein a metal exterior surface of the first housing has an arithmetic average roughness between 1 μm and 20 μm, or wherein the first housing is made of zinc, copper, aluminium, or alloy thereof, and a metal exterior surface of the first housing has an arithmetic average roughness between 1 μm and 20 μm.

10. The switch device according to claim 1, wherein the first housing encloses the movable contact assembly when the switch device is in an open state.

11. The switch device according to claim 1, further comprising a second electrically conductive housing, the second housing enclosing and being electrically connected to the stationary contact assembly for being at a same electrical potential as the stationary contact assembly.

12. The switch device according to claim 1, further comprising a third electrically insulating housing within which the first movable contact assembly is movable, the third housing being arranged between the first housing and the second housing.

13. The switch device according to claim 1, wherein the first terminal is connected to the first housing at a first terminal inner portion, or between a connection with the first conductive line or inflexible conductor and a first terminal outer portion or a periphery of the first housing.

14. An electric power distribution switchgear comprising a sealed gas tight enclosure and a switch device for operating with a dielectric gas having a global warming potential lower than that of SF6 being inside the sealed gas tight enclosure, the switch device being according to claim 1.

15. The electric power distribution switchgear of claim 14, wherein the dielectric gas is air, dry air, or an organo-fluorine compound comprising at least one of a group consisting of: a fluorether, an oxirane, a fluoramine, a fluoroketone, a fluoroolefin, a fluoronitrile, and mixtures and decomposition products thereof.

16. The switch device according to claim 1, wherein an end of the flexible conductor of the first conductive line is mechanically connected to the movable contact assembly.

17. The switch device according to claim 1, wherein the first conductive line comprises an inflexible conductor that is electrically connected to the flexible conductor.

18. The switch device according to claim 17, wherein the inflexible conductor of the first conductive line is physically connected to the first terminal.

* * * * *